(12) United States Patent
Zheng et al.

(10) Patent No.: US 12,429,022 B2
(45) Date of Patent: Sep. 30, 2025

(54) WATER TRANSPORTATION PIPE POWER GENERATION DEVICE WITH FLOW-REGULATING AND PRESSURE-REGULATING FUNCTION

(71) Applicant: Ningbo University, Zhejiang (CN)

(72) Inventors: Rongyue Zheng, Zhejiang (CN); Zesong Yang, Zhejiang (CN); David Zhiwei Zhu, Zhejiang (CN)

(73) Assignee: Ningbo University, Ningbo (CN)

( * ) Notice: Subject to any disclaimer, the term of this patent is extended or adjusted under 35 U.S.C. 154(b) by 0 days.

(21) Appl. No.: 18/419,110

(22) Filed: Jan. 22, 2024

(65) Prior Publication Data
US 2025/0043761 A1  Feb. 6, 2025

(30) Foreign Application Priority Data
Jul. 31, 2023 (CN) .......................... 202310946920.1

(51) Int. Cl.
*F03B 3/04* (2006.01)
*F03B 11/00* (2006.01)
*H02K 7/18* (2006.01)

(52) U.S. Cl.
CPC .............. *F03B 3/04* (2013.01); *F03B 11/008* (2013.01); *H02K 7/1823* (2013.01)

(58) Field of Classification Search
CPC ......... F03B 3/04; F03B 11/008; H02K 7/1823
See application file for complete search history.

(56) References Cited

U.S. PATENT DOCUMENTS

| | | | | |
|---|---|---|---|---|
| 4,123,666 A | * | 10/1978 | Miller ................. | F16C 32/0666 415/110 |
| 5,040,945 A | * | 8/1991 | Levesque .................. | F03B 3/04 290/52 |
| 5,675,203 A | * | 10/1997 | Schulze .................... | B60K 6/26 903/906 |
| 6,242,832 B1 | * | 6/2001 | Lamb .................... | H02K 49/046 310/114 |

(Continued)

*Primary Examiner* — Oluseye Iwarere
*Assistant Examiner* — Thomas K Quigley
(74) *Attorney, Agent, or Firm* — Bayramoglu Law Offices LLC

(57) ABSTRACT

A water transportation pipe power generation device with flow-regulating and pressure-regulating function is provided comprising a tubular power generator housing, a stator component fixedly inside and a tubular rotor component coaxially disposed inside the stator component. The stator component comprises fixed coil windings uniformly distributed on an outer circumferential surface of the rotor component and an adjustable coil winding capable of performing axial movement along the rotor component and adjusting an axial position to change a magnetic flux. The rotor component comprises a tubular rotor housing for a water flow to run through. Multiple spirally-distributed rotor blades are disposed on an inner circumferential surface of the rotor housing, and permanent magnet groups in sensing cooperation with the fixed coil windings and the adjustable coil winding are disposed on an outer circumferential surface of the rotor housing. The rotor component can coaxially rotate for power generation relative to the stator component.

13 Claims, 7 Drawing Sheets

(56) References Cited

U.S. PATENT DOCUMENTS

| | | | | |
|---|---|---|---|---|
| 6,267,551 B1* | 7/2001 | Dentinger | F03B 3/126 | 415/214.1 |
| 6,492,753 B2* | 12/2002 | Zepp | H02K 21/024 | 310/90 |
| 6,555,941 B1* | 4/2003 | Zepp | H02K 21/024 | 310/90 |
| 7,021,905 B2* | 4/2006 | Torrey | F04C 15/008 | 310/63 |
| 7,226,324 B2* | 6/2007 | Roos | B63H 11/06 | 440/38 |
| 7,549,939 B2* | 6/2009 | Strauss | H02K 51/00 | 475/5 |
| 7,804,263 B2* | 9/2010 | Himmelmann | H02K 7/12 | 318/140 |
| 8,269,389 B1* | 9/2012 | Somerville | H02K 21/12 | 310/191 |
| 8,911,271 B2* | 12/2014 | Shibayama | B63H 11/08 | 440/38 |
| 9,479,037 B2* | 10/2016 | Bailey | B63H 21/14 | |
| 9,748,886 B1* | 8/2017 | McDonald | B63H 23/10 | |
| 9,819,296 B2* | 11/2017 | Bailey | H02P 31/00 | |
| 10,014,812 B2* | 7/2018 | Bailey | H02P 25/188 | |
| 10,084,404 B2* | 9/2018 | McDonald | H02K 21/024 | |
| 10,879,828 B2* | 12/2020 | McDonald | B63H 23/10 | |
| 10,892,700 B2* | 1/2021 | Bailey | B60K 6/26 | |
| 11,296,638 B2* | 4/2022 | McDonald | B63H 21/14 | |
| 11,362,611 B2* | 6/2022 | Bailey | B60K 6/26 | |
| 11,643,168 B1* | 5/2023 | Cataluna | B63B 1/042 | 114/61.32 |
| 11,695,364 B2* | 7/2023 | McDonald | H02K 16/04 | 290/9 |
| 11,863,033 B2* | 1/2024 | Zheng | H02K 7/09 | |
| 11,888,421 B2* | 1/2024 | Bailey | B60K 6/26 | |
| 11,894,738 B2* | 2/2024 | Zatorski | H02K 11/30 | |
| 11,988,151 B1* | 5/2024 | Smith | H02K 7/1823 | |
| 2005/0104469 A1* | 5/2005 | Zepp | H02K 11/21 | 310/191 |
| 2006/0043738 A1* | 3/2006 | Roos | F03B 3/103 | 290/54 |
| 2006/0121139 A1* | 6/2006 | Murb | B29B 9/065 | 425/313 |
| 2007/0096581 A1* | 5/2007 | Zepp | H02K 21/024 | 310/191 |
| 2007/0145751 A1* | 6/2007 | Roos | F03B 13/105 | 290/52 |
| 2008/0150381 A1* | 6/2008 | Groening | H02K 7/11 | 290/55 |
| 2008/0197730 A1* | 8/2008 | Himmelmann | B60K 6/547 | 475/198 |
| 2008/0265702 A1* | 10/2008 | Yeh | H02K 21/026 | 310/90 |
| 2009/0315329 A1* | 12/2009 | Duffey | F03D 80/70 | 290/44 |
| 2010/0038910 A1* | 2/2010 | da Silva | H02K 7/1823 | 290/52 |
| 2010/0213778 A1* | 8/2010 | Knutson | H02K 53/00 | 310/154.02 |
| 2010/0308591 A1* | 12/2010 | Godfrey | F03B 13/00 | 290/54 |
| 2011/0042961 A1* | 2/2011 | Van Breemen-Schneider | H02K 21/24 | 290/55 |
| 2011/0272950 A1* | 11/2011 | Stiesdal | H02K 1/148 | 290/55 |
| 2012/0326553 A1* | 12/2012 | Peng | H02K 51/00 | 310/209 |
| 2014/0091746 A1* | 4/2014 | Fujishima | H02K 16/00 | 318/538 |
| 2018/0245403 A1* | 8/2018 | Chambers | H02K 7/1823 | |
| 2022/0200369 A1* | 6/2022 | Humphries | H02K 9/00 | |
| 2023/0117718 A1* | 4/2023 | Zheng | G01D 5/2013 | 310/68 B |

\* cited by examiner

WATER TRANSPORTATION PIPE POWER GENERATION DEVICE WITH FLOW-REGULATING AND PRESSURE-REGULATING FUNCTION

This application is based upon and claims priority to Chinese Patent Application No. 202310946920.1, filed on Jul. 31, 2023, the entire contents of which are incorporated herein by reference.

TECHNICAL FIELD

The present disclosure relates to the field of hydropower technologies and in particular to a water transportation pipe power generation device with flow-regulating and pressure-regulating function.

BACKGROUND

The daily water of the residents and the industrial water in most areas are taken from reservoirs where power generation sets are built to supply power to one area by taking measures such as connection with power grids. But, along with the development of cities, the water consumption soars. In most cases, the water supply reservoirs around the cities are mainly used to supply water for the industries and residents. Compared with less water consumption and sufficient hydraulic potential energy in the upstream of the water sources, the reservoir areas around the cities have no surplus water for power generation and hence, the original power generation sets are basically disused.

Generally, there is a significant horizontal height difference between the reservoirs and the water treatment plants in the downstream. The water treatment plants usually take water from the reservoirs by pipes of a diameter of one to three meters. Due to the height difference, the internal pressure of the water pipes is high and it is required to mount a multi-stage flow-regulating and pressure-regulating valve depending on circumstances to avoid pipe burst or other problems arising from excessively large pressure. It will be a waste that no energy utilization is performed on the hydropower resources of the water transported by the pipes. But, the existing hydropower generation facilities cannot utilize the hydropower resources transported to downstream by the pipes for the following reasons: the water volume within a given space is small; the water channeling pipes have a long travel; the complex surrounding environment is not applicable to construction of hydropower equipment; or the water volume per unit time is limited due to insufficient drop.

In one word, the existing hydropower technologies cannot utilize the water transported between upstream and downstream of the reservoirs around the cities to perform power generation, leading to energy wastes.

SUMMARY

The technical problem to be solved by the present disclosure is that the existing hydropower technologies cannot utilize water transported between upstream and downstream of the reservoirs around the cities to perform power generation, leading to energy wastes.

In order to solve the above problems, the present disclosure provides a water transportation pipe power generation device with flow-regulating and pressure-regulating function, which comprises a tubular power generator housing with both ends docking with a pipe, a stator component fixedly mounted inside the housing and a tubular rotor component coaxially disposed inside the stator component in a nesting way. The stator component comprises fixed coil windings uniformly distributed on an outer circumferential surface of the rotor component and an adjustable coil winding capable of performing axial movement along the rotor component and adjusting an axial position to change a magnetic flux. The rotor component comprises a tubular rotor housing for a water flow to run through. Multiple spirally-distributed rotor blades are disposed on an inner circumferential surface of the rotor housing, and permanent magnet groups in sensing cooperation with the fixed coil windings and the adjustable coil winding are disposed on an outer circumferential surface of the rotor housing. The rotor component can coaxially rotate for power generation relative to the stator component under the push action of the water flow to the rotor blades.

In the water transportation pipe power generation device with flow-regulating and pressure-regulating function according to the embodiments of the present disclosure, a conventional hydropower device design is improved such that the entire structure is a tubular housing which can be directly connected with a water transportation pipe, so as to lower the requirements of the conventional open-type power generator sets for water flow rate and water flow stability. Thus, the device can use a hydraulic potential energy relatively less rich in the water transportation pipes and therefore can effectively recover and utilize the hydraulic potential energy resource between the upstream reservoir and the downstream water treatment plant or between the water treatment plant and the downstream water users, thereby avoiding wastes.

Specifically, due to the structure of the tubular rotor and stator mutually nested, water can run through the tubular housing of the rotor and interacts with the blades structures on an inner side of the rotor so as to push the rotor to entirely rotate and hence achieve induction generation with the coil windings of the stator. The coil windings comprise an adjustable part and a total magnetic flux of the electromagnetic induction can be adjusted by axial relative movement between the part and the rotor, so as to adjust a resistance of the power generator device against the water flow and thus perform adaptive adjustment based on the current water pressure and flow rate, thereby avoiding inability to rotate the rotor due to small water flow rate or inadequate recovery of the potential energy due to large water flow rate. This design, on the one hand, achieves the optimal power generation effect, and on the other hand, controls, by this structure consuming the potential energy in the pipe, the flow rate and pressure in the pipe within a given range, which is equivalent to the flow-regulating and pressure-regulating valve in the water network construction, providing better guarantee for the pipe safety. In conclusion, the water transportation pipe power generation device with flow-regulating and pressure-regulating function according to the present disclosure can effectively solve the technical problem that the existing hydropower technologies cannot utilize water transported between upstream and downstream of the reservoirs around the cities to perform power generation, leading to energy wastes.

As a preferred solution, the stator component further comprises a tubular stator inner housing between the power generator housing and the fixed coil windings. The fixed coil windings are uniformly distributed and fixed on a side surface of an inner edge of the stator inner housing. An adjustable mounting ring may be axially and slidably sleeved around the stator inner housing, and the adjustable coil winding is mounted at a sidewall of the adjustable mounting ring. The entire structure design of the stator component and the structure of the adjustable winding are optimized.

As a preferred solution, a plurality of guide grooves are disposed axially on an outer sidewall of the stator inner housing, and convex guide slide blocks are disposed on an inner sidewall of the adjustable mounting ring, and thus, the guide slide blocks are in slide cooperation with the guide grooves. A fixed rack is disposed along a length direction in one guide groove and an axial adjustment gear engaged with the fixed rack is disposed at a side of the guide slide block in cooperation with the guide groove. The axial adjustment gear is connected with an axial feed motor in a drive way and thus the axial adjustment gear can rotate under the drive of the axial feed motor so as to drive the adjustable mounting ring to perform axial feed movement along the stator inner housing. The structure of the adjustable coil winding and the structure of the corresponding stator are optimized to achieve optimized control of the axial feed.

As a preferred solution, the adjustable coil winding comprises a plurality of adjustable coil units circumferentially mounted on the inner sidewall of the adjustable mounting ring. Each adjustable coil unit comprises a closed-loop-shaped coil and a mounting plate for fixedly mounting the coil. The adjustable coil units are connected with a radial distance adjustment structure to adjust a radial distance between the adjustable coil units and the rotor component. On the basis that the axial position of the adjustable coil winding is adjustable, an adjustable range and an adjustment index of the magnetic flux between the rotor and the stator are further optimized by radial distance adjustment.

As a preferred solution, the radial distance adjustment structure comprises an annular tooth ring disposed at an outer edge of the adjustable mounting ring and coaxially and rotatably cooperating with the adjustable mounting ring as well as a gear screw rod in cooperation with the annular tooth ring. A gear side of the gear screw rod is engaged with the annular tooth ring, and a screw rod side is in thread cooperation with a thread hole in the middle part of the mounting plate. With the rotation of the annular tooth ring, the gear screw rod rotates and hence drives the adjustable coil unit to perform feed along a radial direction of the stator component. The specific structure of the radial adjustment of the adjustable coil winding is optimized and a simple and feasible radial adjustment solution is provided.

As a preferred solution, a radial adjustment motor is mounted on a sidewall of the adjustable mounting ring and is in a rotatable drive cooperation with the annular tooth ring through an output gear. The radial adjustment structure design of the adjustable coil winding is further optimized.

As a preferred solution, a guide column is disposed at a position corresponding to each mounting plate at an inner side of the adjustable mounting ring, and a slide hole in slide cooperation with the guide column is disposed at a corresponding position on the mounting plate. By cooperation of the guide column and the slide hole, the mounting plate can be limited, ensuring its radial feed movement. The radial adjustment structure design of the adjustable coil winding is further optimized.

As a preferred solution, a flow guide disk structure is disposed at an inlet end of the rotor housing to uniformly direct the water flow to the position of the rotor blades on the inner sidewall of the rotor housing. The flow guide disk structure comprises a conical flow guide head and water split blades uniformly distributed on an outer edge of the flow guide head. A pointed end of the flow guide head faces toward the incoming water. Adaptive optimization is performed on the tubular structure of the power generator to ensure the rotational push of the water flow for the rotor component.

As a preferred solution, an axially-extending extension part is disposed at both sides of the power generator housing respectively. An end head of the extension parts is provided with a pipe mouth docking structure to fixedly dock with the upstream and downstream pipes. The docking design between the power generator and the pipes located back and forth is optimized.

As a preferred solution, the rotor blades can be connected to the rotor housing in an angle-adjustable manner by connection shafts. An angle control mechanism is connected at a base of each connection shaft to change an angle of the rotor blades based on the water flow circumstances. The design of the rotor blades in the rotor component is optimized such that the rotor has more controlled interference on the water flow running through the pipe.

As a preferred solution, the power generator housing is provided with an electric control box in which respective connectors of the fixed coil windings and the adjustable coil winding are integrated. The electric control box is further provided with a motor controller connected, in a controlled manner, with the radial adjustment motor, the axial feed motor and the angle control mechanism. The circuit control structure design of the power generator is optimized.

As a preferred solution, a water pressure sensor is disposed in the rotor housing and a primary control module is disposed in the electric control box. The water pressure sensor and the motor controller are both connected to the primary control module in a controlled manner. The rotor housing is further connected with a rotation speed sensor in a sensing manner, and the rotation speed sensor is connected with the primary control module.

Numerals of the drawings 1 to 7 are described below:
1. power generator housing, 1-1. electric control box, 1-2. extension part, 1-3. pipe mouth docking structure, 2.

stator component, 2-1. stator inner housing, 2-2. fixed coil winding, 2-3. adjustable mounting ring, 2-4. adjustable coil unit, 2-5. guide slide block, 2-6. guide groove, 2-7. annular tooth ring, 2-8. gear screw rod, 2-9. mounting plate, 2-10. slide hole, 2-11. radial adjustment mechanism, 2-12. fixed rack, 3. rotor component, 3-1. rotor housing, 3-2. permanent magnet group, 3-3. rotor blade, 3-4. connection shaft, 4. flow guide disk structure, 4-1. flow guide head, and 4-2. water split blade.

DETAILED DESCRIPTIONS OF EMBODIMENTS

The technical solutions of the present disclosure will be fully and clearly described below. Apparently, the embodiments described herein are merely some embodiments rather than all embodiments. All other embodiments obtained by those skilled in the arts based on these embodiments in the present disclosure without making creative work shall fall within the scope of protection of the present disclosure.

Figure 1:
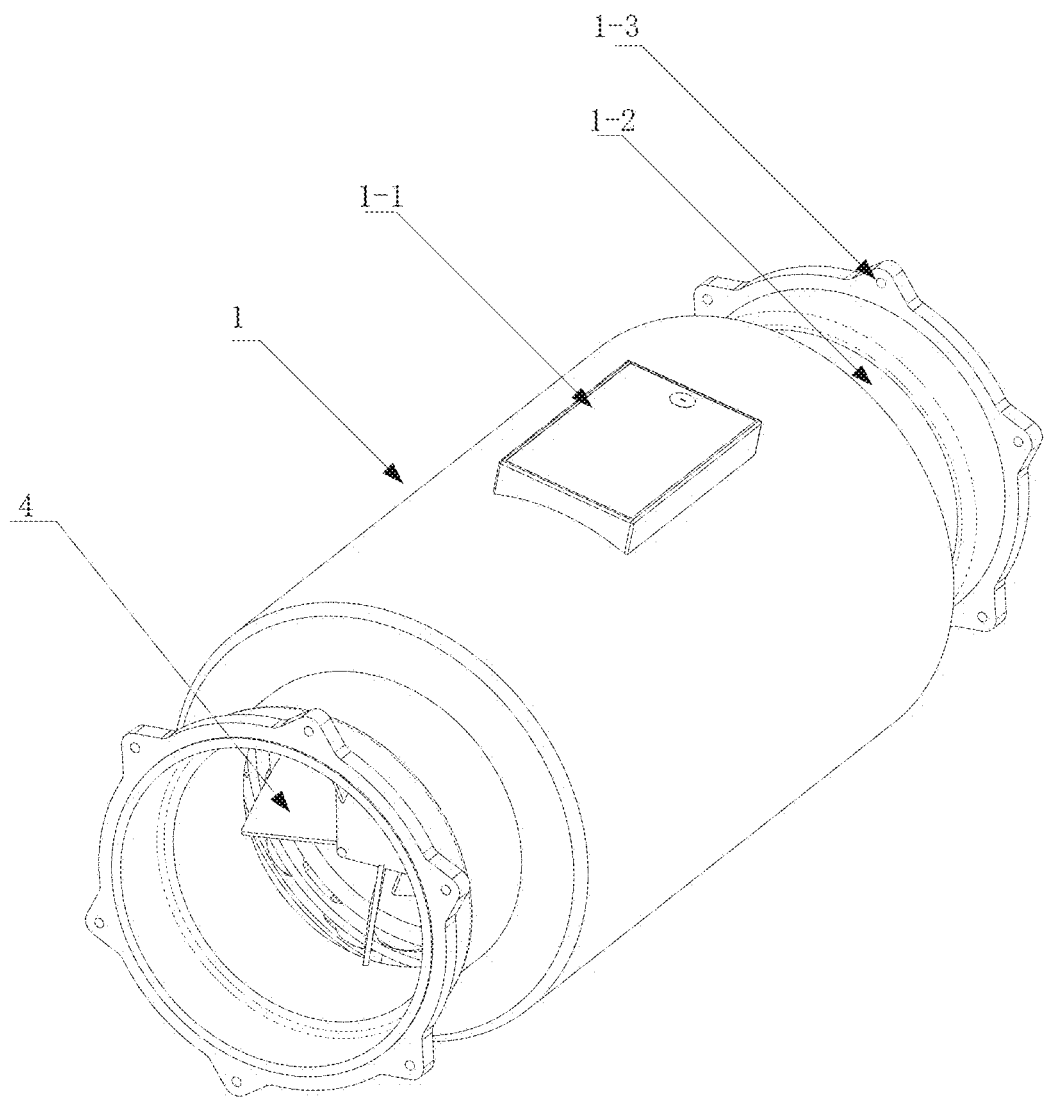
FIG. 1 is a structural schematic diagram illustrating a water transportation pipe power generation device with flow-regulating and pressure-regulating function according to the present disclosure.
Figure 2:
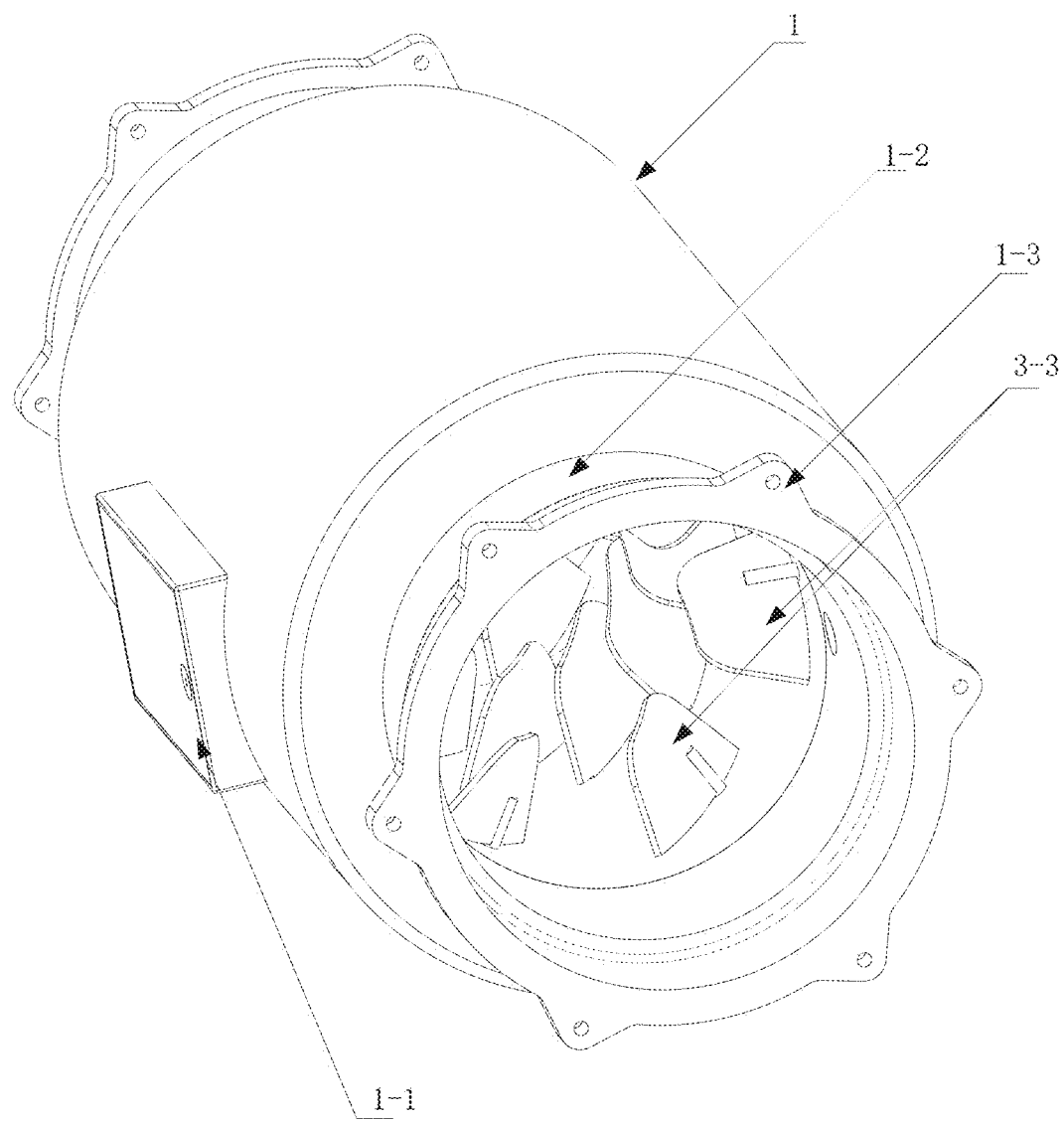
FIG. 2 is a structural schematic diagram of another side of the water transportation pipe power generation device with flow-regulating and pressure-regulating function in FIG. 1.
Figure 3:
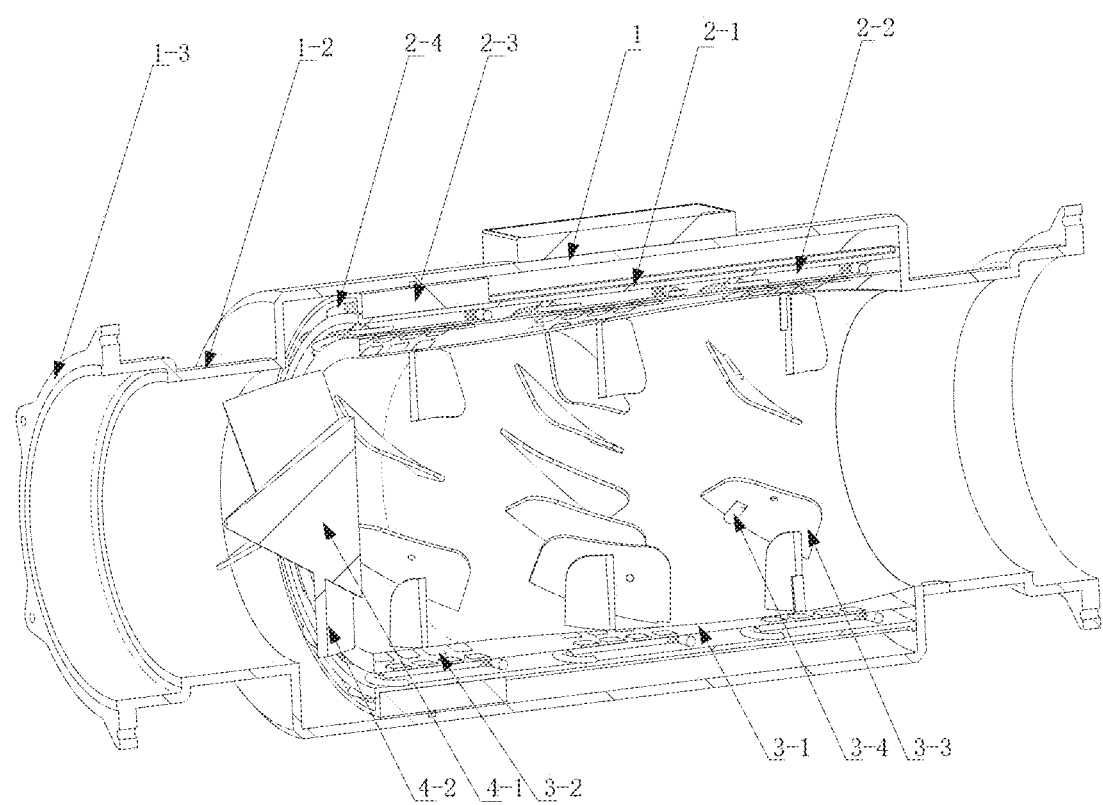
FIG. 3 is a structural schematic diagram of a side section of the water transportation pipe power generation device with flow-regulating and pressure-regulating function in FIG. 1.
Figure 4:
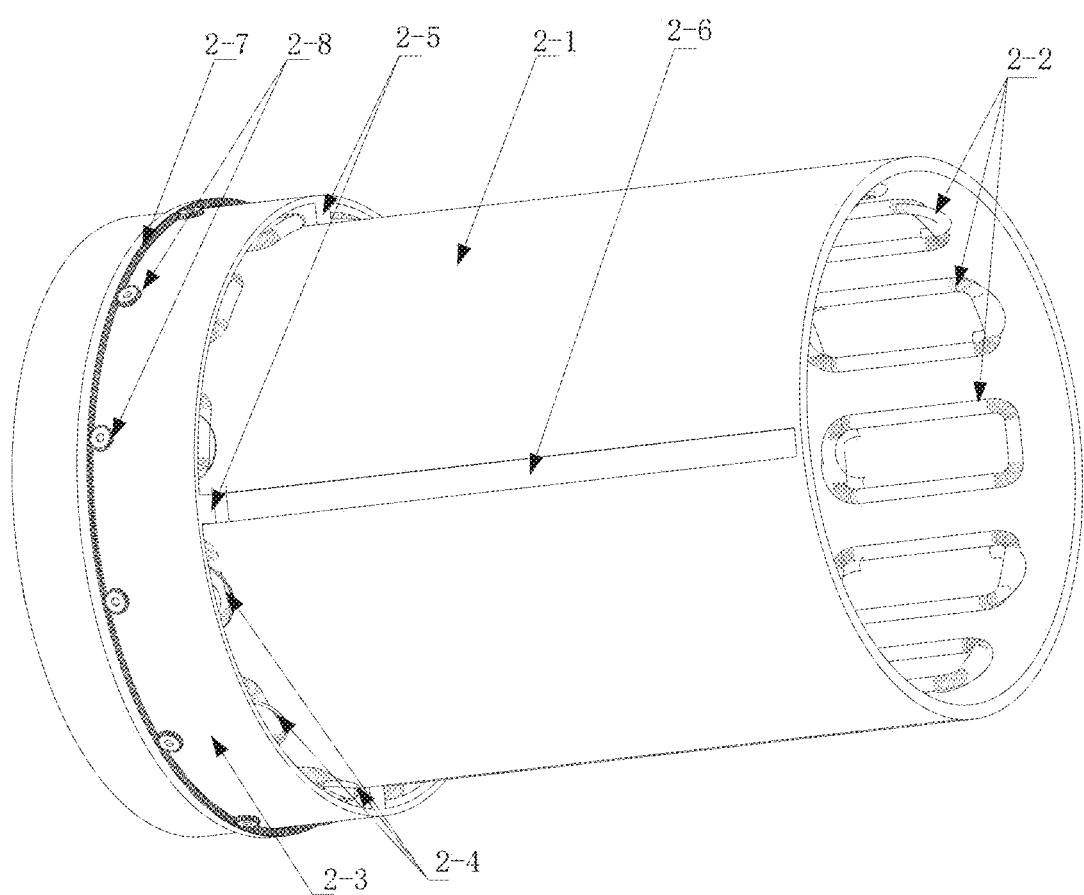
FIG. 4 is a structural schematic diagram of a stator component of the water transportation pipe power generation device with flow-regulating and pressure-regulating function in FIG. 1.
Figure 6:
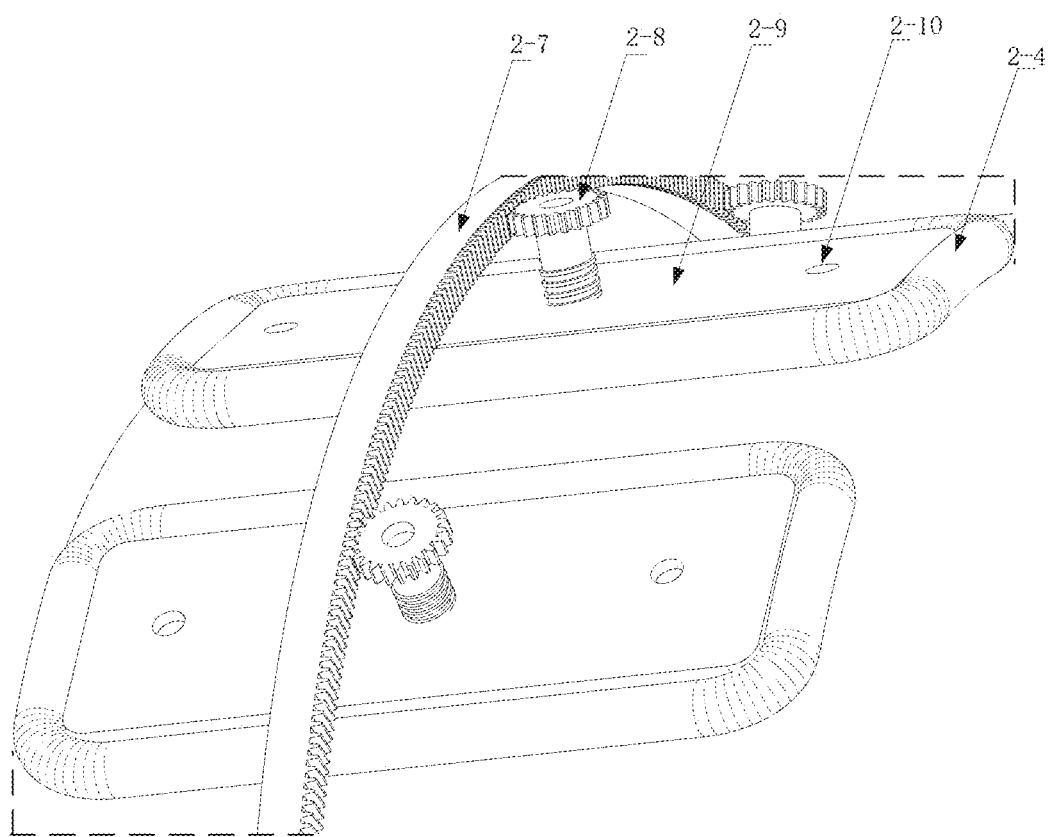
FIG. 6 is a structural schematic diagram of an internal structure of an adjustable coil winding in a stator component of the water transportation pipe power generation device with flow-regulating and pressure-regulating function in FIG. 1.
Figure 7:
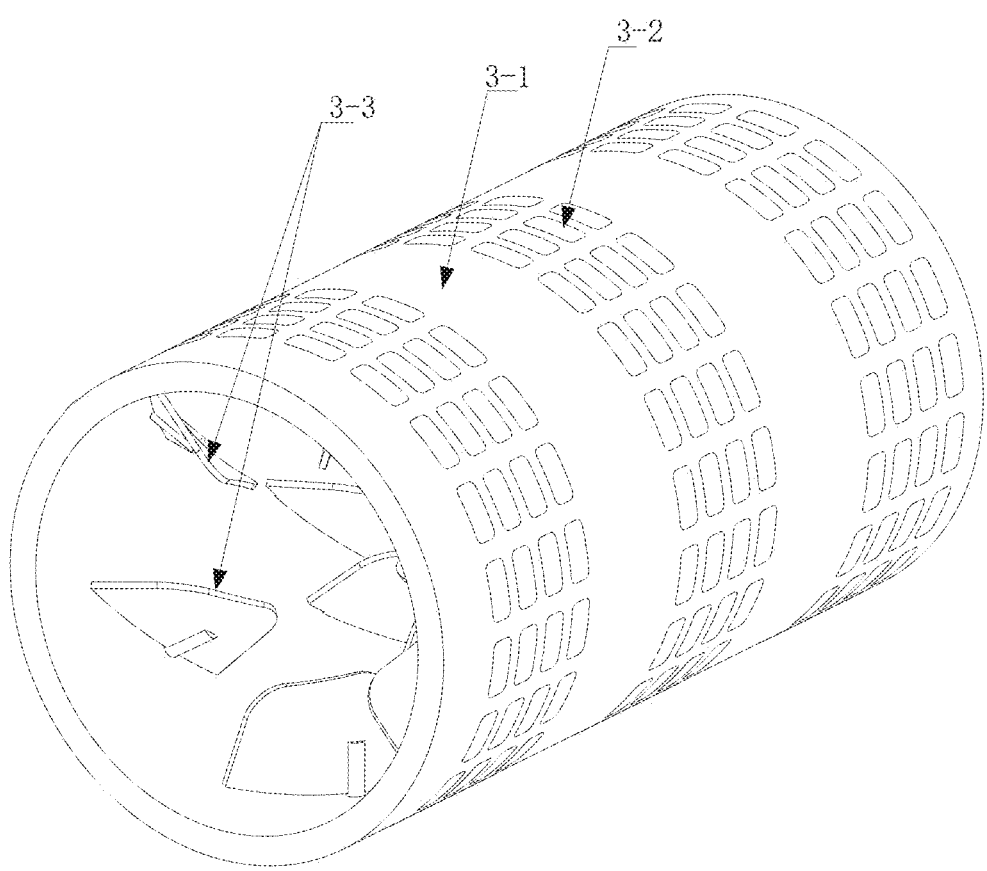
FIG. 7 is a structural schematic diagram illustrating a rotor component of the water transportation pipe power generation device with flow-regulating and pressure-regulating function in FIG. 1.

FIG. 1 is a structural schematic diagram illustrating a water transportation pipe power generation device with flow-regulating and pressure-regulating function according to the present disclosure. FIG. 2 is a structural schematic diagram of another side of the water transportation pipe power generation device with flow-regulating and pressure-regulating function in FIG. 1. FIG. 3 is a structural schematic diagram of a side section of the water transportation pipe power generation device with flow-regulating and pressure-regulating function in FIG. 1. FIG. 4 is a structural schematic diagram of a stator component of the water transportation pipe power generation device with flow-regulating and pressure-regulating function in FIG. 1. FIG. 6 is a structural schematic diagram of a stator component of the water transportation pipe power generation device with flow-regulating and pressure-regulating function in FIG. 1.

This embodiment provides a water transportation pipe power generation device with flow-regulating and pressure-regulating function, which comprises a tubular power generator housing 1 with both ends docking with a pipe, a stator component 2 fixedly mounted inside the housing and a tubular rotor component 3 coaxially disposed inside the stator component 2 in a nesting way. The stator component 2 comprises fixed coil windings 2-2 uniformly distributed on an outer circumferential surface of the rotor component 3 and an adjustable coil winding capable of performing axial movement along the rotor component 3 and adjusting an axial position to change a magnetic flux. The rotor component 3 comprises a tubular rotor housing 3-1 for a water flow to run through. Multiple spirally-distributed rotor blades 3-3 are disposed on an inner circumferential surface of the rotor housing 3-1, and permanent magnet groups 3-2 in sensing cooperation with the fixed coil windings 2-2 and the adjustable coil winding are disposed on an outer circumferential surface of the rotor housing 3-1. The rotor component 3 can coaxially rotate for power generation relative to the stator component 2 under the push action of the water flow to the rotor blades 3-3.

In the water transportation pipe power generation device with flow-regulating and pressure-regulating function according to the embodiments of the present disclosure, a conventional hydropower device design is improved such that the entire structure is a tubular housing which can be directly connected with a water transportation pipe, so as to reduce the requirements of the conventional open-type power generator sets for water flow rate and water flow stability. Thus, the device can use a hydraulic potential energy relatively less rich in the water transportation pipes and thus can effectively recover and utilize the hydraulic potential energy resource between the upstream reservoir and the downstream water treatment plant or between the water treatment plant and the downstream water users, thereby avoiding wastes.

Specifically, due to the structure of the tubular rotor and stator mutually nested, water can run through the tubular housing of the rotor and interacts with the blades structures on an inner side of the rotor so as to push the rotor to entirely rotate and hence achieve induction generation with the coil windings of the stator. The coil windings comprise an adjustable part and a total magnetic flux of the electromagnetic induction can be adjusted by axial relative movement between the part and the rotor, so as to adjust a resistance of the power generator device against the water flow and thus perform adaptive adjustment based on the current water pressure and flow rate, thereby avoiding inability to rotate the rotor due to small water flow rate or inadequate recovery of the potential energy due to large water flow rate. This design, on the one hand, achieves the optimal power generation effect, and on the other hand, controls, by this structure, the flow rate and pressure in the pipe within a given range to ensure better safety of the pipe. In conclusion, the water transportation pipe power generation device with flow-regulating and pressure-regulating function according to the present disclosure can effectively solve the technical problem that the existing hydropower technologies cannot utilize water transported between upstream and downstream of the reservoirs around the cities to perform power generation, leading to energy wastes.

The above water transportation pipe power generation devices can be series-connected in multiple stages to be distributed at each part of a same water network. As long as there exists a drop potential energy, and pressure relief is also to be performed using a flow limiting valve or pressure-regulating valve, the pipe power generator can be mounted to recover and utilize the potential energy wasted by the pressure relief. In this way, more full and comprehensive hydraulic energy utilization can be achieved on the basis of normal hydropower generation in reservoir areas.

In the technical solution provided by this embodiment, the stator component 3 further comprises a tubular stator inner housing 2-1 between the power generator housing 1 and the fixed coil windings 2-2. The fixed coil windings 2-2 are uniformly distributed and fixed on a side surface of an inner edge of the stator inner housing 2-1. An adjustable mounting ring 2-3 may be axially and slidably sleeved around the stator inner housing, and the adjustable coil winding is mounted at a sidewall of the adjustable mounting ring 2-3.

It should be noted that in cooperation with the distribution manner of the fixed coil windings, the permanent magnet groups fixed on the rotor housing are also distributed like this, namely, circumferentially and uniformly distributed in groups. In different regions of axial direction, the permanent magnet groups are distributed with different densities. Therefore, the adjustable coil winding can obtain the effect of magnetic feature change by axial position adjustment relative to the rotor component.

This design optimizes the entire structure design of the stator component and the structure of the adjustable winding. The stator inner housing is nested to the inner edge of the power generator housing. The fixed coil windings comprise a plurality of coil units which are uniformly distributed on an inner side surface of the stator inner housing along axial and circumferential directions of the stator inner housing. By using its cylindrical structure, the stator inner housing can, on the one hand, facilitate mounting the fixed coil windings and on the other hand, help the axial slide cooperation of the adjustable coil winding. The adjustable mounting ring is disposed around the stator inner housing to facilitate the mounting of the adjustable coil winding.

On the basis of the structure in the above embodiment, in the technical solution of this embodiment, a plurality of guide grooves 2-6 are disposed axially on an outer sidewall of the stator inner housing 2-1, and convex guide slide blocks 2-5 are disposed on an inner sidewall of the adjustable mounting ring 2-3, and thus, the guide slide blocks 2-5 are in slide cooperation with the guide grooves 2-6. A fixed rack is disposed along a length direction in one guide groove 2-6 and an axial adjustment gear engaged with the fixed rack is disposed at a side of the guide slide block 2-5 in cooperation with the guide groove 2-6. The axial adjustment gear is connected with an axial feed motor in a drive way and thus the axial adjustment gear can rotate under the drive of the axial feed motor so as to drive the adjustable mounting ring 2-3 to perform axial feed movement along the stator inner housing 2-1.

In the technical solution, the structure of the adjustable coil winding and the structure of the corresponding stator are optimized to achieve optimized control of the axial feed. Specifically, the guide grooves are axially disposed on the outer sidewall of the stator inner housing and the guide slide blocks are disposed at the inner side of the adjustable mounting ring, and thus, by sliding cooperation of the guide slide blocks and the guide grooves, the adjustable mounting ring can be circumferentially limited during axial slide to prevent offset rotation and thus adapt to the working mode of the induction generation.

Figure 5:
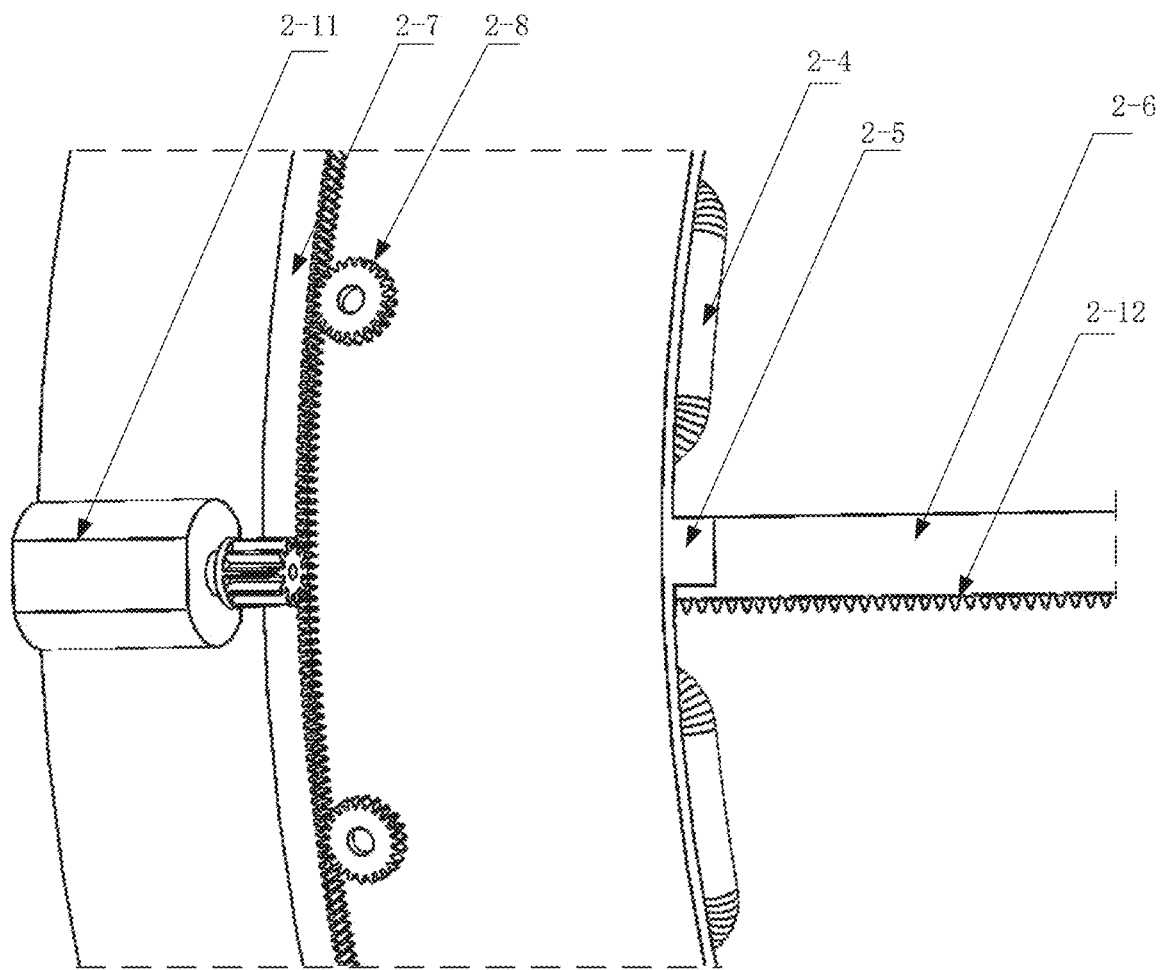
FIG. 5 is an enlarged view of a partial structure of a side of the stator component in FIG. 4.

FIG. 5 is an enlarged view of a partial structure of a side of the stator component in FIG. 4.

Furthermore, a fixed rack 2-12 is disposed along a length direction in one guide groove and a gear disposed at a side of the guide slide block in cooperation with the guide groove. The gear is connected cooperatively with a motor. The motor outputs rotation to drive the axial adjustment gear to rotate. Under the action of the fixed rack in cooperation with the gear, the adjustable mounting ring is driven to perform axial feed. The axial feed action control structure can be operated stably and easily and easy to control automatically, and thus the axial position of the adjustable coil winding can be adjusted at any time based on the water flow under the working mode.

In the technical solution provided by this embodiment, the adjustable coil winding comprises a plurality of adjustable coil units 2-4 circumferentially mounted on the inner sidewall of the adjustable mounting ring 2-3. Each adjustable coil unit 2-4 comprises a closed-loop-shaped coil and a mounting plate 2-9 for fixedly mounting the coil. The adjustable coil units 2-4 are connected with a radial distance adjustment structure to adjust a radial distance between the adjustable coil units 2-4 and the rotor component 3.

On the basis that the axial position of the adjustable coil winding is adjustable in the above embodiment, an adjustable range and an adjustment index of the magnetic flux between the rotor and the stator are further optimized by radial distance adjustment; by disposing the radial distance adjustment structure, the radial distance between the adjustable coil winding and the rotor permanent magnet can be adjusted so as to further change induced magnetic feature between the permanent magnet and the coil winding and obtain a larger magnetic feature adjustment range. In this way, adaptation to the water flow is performed and more complete adjustment to the working parameters of the power generation set can be performed. For example, in a case of small water flow and low pressure, the magnetic flux resistance is reduced; in a case of large water flow and high water pressure, the magnetic flux resistance is increased. In this way, the optimization of the power generation amount and the stabilization of the power generation mean value can be achieved and adaptive adjustment to the flow rate in the pipe can be carried out as well, for example, the water pressure is reduced by adjusting the resistance to the water flow, so as to ensure the pipe safety.

FIG. 6 is a schematic diagram of an internal structure of an adjustable coil winding in the stator component of the water transportation pipe power generation device with flow-regulating and pressure-regulating function in FIG. 1.

In the technical solution provided by this embodiment, the radial distance adjustment structure comprises an annular tooth ring 2-7 disposed at an outer edge of the adjustable mounting ring 2-3 and coaxially and rotatably cooperating with the adjustable mounting ring 2-3 as well as a gear screw rod 2-8 in cooperation with the annular tooth ring 2-7. A gear side of the gear screw rod 2-8 is engaged with the annular tooth ring 2-7, and a screw rod side is in thread cooperation with a thread hole in the middle part of the mounting plate 2-9. With the rotation of the annular tooth ring 2-7, the gear screw rod 2-8 rotates and hence drives the adjustable coil unit to perform feed along a radial direction of the stator component 2.

This design optimizes the specific structure of the radial adjustment of the adjustable coil winding and a simple and feasible radial adjustment solution is provided. The rotation of the annular tooth ring drives the rotation of the gear screw rod which is thread cooperation with the mounting plate, such that the radial feed of the mounting plate and the coil fixed thereon can be controlled. The design is simple in structure and good in control effect.

On the basis of the structure in the above embodiment, furthermore, a radial adjustment motor 2-11 is mounted on a sidewall of the adjustable mounting ring 2-3 and is in a rotatable drive cooperation with the annular tooth ring 2-7 through an output gear. The radial adjustment motor outputs rotational power to drive the annular tooth ring to help achieve automatic adjustment control and the implementation of the remote and feedback control.

In the technical solution provided by this embodiment, a guide column is disposed at a position corresponding to each mounting plate 2-9 at an inner side of the adjustable mounting ring 2-3, and a slide hole 2-10 in slide cooperation with the guide column is disposed at a corresponding position on the mounting plate 2-9. By cooperation of the guide column and the slide hole 2-10, the mounting plate 2-9 can be limited, ensuring its radial feed movement. There is provided a design of ensuring the feed direction of the coil winding for the radial feed adjustment of the adjustable coil winding. By disposing the guide columns at the inner side of the adjustable coil winding, the guide columns extend along a radial direction of the device entirety, namely, in parallel with the radial feed direction of the mounting plate. A slide hole is disposed on the mounting plates, and the guide columns run through the slide holes. By cooperation of both, the radial feed of each adjustable coil unit can be limited, avoiding its mistaken movement.

In the technical solution provided by this embodiment, a flow guide disk structure 4 is disposed at an inlet end of the rotor housing 3-1 to uniformly direct the water flow to the position of the rotor blades 3-3 on the inner sidewall of the rotor housing 3-1. The flow guide disk structure 4 comprises a conical flow guide head 4-1 and water split blades 4-2 uniformly distributed on an outer edge of the flow guide head 4-1. A pointed end of the flow guide head 4-1 faces toward the incoming water.

This design performs adaptive optimization on the tubular structure of the power generator to ensure the rotational push of the water flow for the rotor component. The flow guide disk structure is disposed in the central region of the water inflow end of the rotor housing, and the middle conical or cone-like flow guide head can uniformly disperse the incoming water outwardly so as to ensure the water flow preferentially runs through the position of the rotor blades on the inner sidewall of the rotor housing. In this case, the problem that when the incoming water runs at a small flow rate, the water flow can only run through a local area inside the rotor housing and thus cannot push the rotor blades to drive the rotation of the rotor can be avoided. This structure can effectively guarantee the normal operation of the tubular power generator.

In the technical solution provided by this embodiment, an axially-extending extension part 1-2 is disposed at both sides of the power generator housing 1 respectively. An end head of the extension parts 1-2 is provided with a pipe mouth docking structure 1-3 to fixedly dock with the upstream and downstream pipes. For the application environments of the tubular power generator, its structure is optimized. The pipe mouth docking structure is disposed at both sides of the power generator housing respectively such that it can be directly mounted to the water pipe or one segment of water pipe can be replaced. This design has general applicability to the water pipes, which ensures easy and quick mounting.

In the technical solution provided by this embodiment, the power generator housing 1 is provided with an electric control box 1-1 in which respective connectors of the fixed coil windings 2-2 and the adjustable coil winding are integrated. The electric control box 1-1 is further provided with a motor controller connected, in a controlled manner, with the radial adjustment motor and the axial feed motor. The design optimizes the circuit control structure design of the power generator. Specifically, the electric control box 1-1 may further include normal electric control elements corresponding to the power generator set such that these elements can be integrated at a same position outside the power generator housing, helping operation and repair.

In the technical solution provided by this embodiment, the rotor blades 3-3 can be connected to the rotor housing in an angle-adjustable manner by connection shafts 3-4. An angle control mechanism is connected at a base of each connection shaft 3-4 to change an angle of the rotor blades 3-3 based on the water flow circumstances.

This design optimizes the design of the rotor blades in the rotor component. Thus, the rotor can achieve more controlled interference on the water flow running through the pipe. The control on the angle of the rotor blades is essentially similar in principle to the adjustment to the magnetic flux between the rotor and the stator. By adjustment to the blade angle, the resistance of the rotor housing against the water flow can be more directly adjusted and the effect of adjustment to the water flow pressure can be obtained more directly.

In the technical solution provided by this embodiment, a water pressure sensor is disposed in the rotor housing 3-1 and a primary control module is disposed in the electric control box 1-1. The water pressure sensor and the motor controller are both connected to the primary control module in a controlled manner. The rotor housing 3-1 is further connected with a rotation speed sensor in a sensing manner, and the rotation speed sensor is connected with the primary control module. By sensing the water pressure and the rotation speed, information about the rotation speed and the water pressure in the pipe of the power generation device can be obtained. The primary control module may act as a flow meter to directly obtain a real-time flow rate in the pipe through calculation based on preset parameters such as the pipe diameter of the rotor housing, the rotation resistance of the rotor (obtained by using position information of the coil winding relative to the permanent magnet group), and an intra-pipe standard pressure and flow rate and the like. Furthermore, the flow rate and pressure information can be fed back to the motor controller to achieve more accurate control. Thus, an optimal generation power adapting to the current water flow circumstances can be obtained while more accurate control is performed on the pressure in the pipe, thereby increasing the pipe safety of the water network.

Although the present disclosure is described as above, the scope of protection of the present disclosure is not limited hereto. Those skilled in the arts can make various variations and modifications to the present disclosure without departing from the spirit and scope of the present disclosure and these variations and modifications all fall within the scope of protection of the present disclosure.

The invention claimed is:

1. A water transportation pipe power generation device comprising:
    a tubular power generator housing, wherein two ends of the housing are configured to dock with a respective pipe;
    a stator component fixedly mounted inside the housing;
    a tubular rotor component coaxially disposed inside the stator component, the rotor component comprising multiple rotor blades and permanent magnet groups,
    wherein the stator component comprises;
        a plurality of fixed coil windings which are uniformly distributed about an outer circumferential surface of the rotor component, and
        an adjustable coil winding configured to be axially adjusted relative to the rotor component to change a magnetic flux,
    wherein the rotor component further comprises a tubular rotor housing for a water flow to run through the rotor component,
    wherein the multiple rotor blades are disposed on an inner circumferential surface of the rotor housing,
    wherein the permanent magnet groups are disposed on an outer circumferential surface of the rotor housing, and
    wherein the rotor component is configured to coaxially rotate relative to the stator component under a push action by said water flow to the rotor blades to generate power with the stator component.

2. The water transportation pipe power generation device of claim 1, wherein the stator component further comprises a tubular stator inner housing between the power generator housing and the plurality of fixed coil windings; the plurality of fixed coil windings are uniformly distributed and fixed on surface of the stator inner housing; an adjustable mounting ring axially and slidably sleeved around the stator inner housing, and the adjustable coil winding is mounted at a wall of the adjustable mounting ring.

3. The water transportation pipe power generation device of claim 2, wherein a plurality of guide grooves are disposed axially on the stator inner housing, and convex guide slide blocks are disposed on the adjustable mounting ring; the guide slide blocks are in slide cooperation with the guide grooves.

4. The water transportation pipe power generation device of claim 3, wherein a fixed rack is disposed along a length direction in one guide groove and an axial adjustment gear engaged with the fixed rack is disposed at a side of the guide slide block in cooperation with the guide groove; the axial adjustment gear is connected with an axial feed motor and the axial adjustment gear is configured to rotate under a drive of the axial feed motor to drive the adjustable mounting ring to move axially along the stator inner housing.

5. The water transportation pipe power generation device of claim 3, wherein the adjustable coil winding comprises a plurality of adjustable coil units circumferentially mounted on the adjustable mounting ring; each adjustable coil unit comprises an additional coil and a mounting plate for fixedly mounting the additional coil; the adjustable coil units are connected with a radial distance adjustment structure to adjust a radial distance between the adjustable coil units and the rotor component.

6. The water transportation pipe power generation device of claim 5, wherein the radial distance adjustment structure comprises an annular tooth ring disposed at an outer edge of the adjustable mounting ring and coaxially cooperating with the adjustable mounting ring and a gear screw rod in cooperation with the annular tooth ring; a gear side of the gear screw rod is engaged with the annular tooth ring, and a screw rod side is in thread cooperation with a thread hole in the middle part of the mounting plate; with the rotation of the annular tooth ring, the gear screw rod rotates and hence drives the adjustable coil unit to perform feed along a radial direction of the stator component.

7. The water transportation pipe power generation device of claim 6, wherein a radial adjustment motor is mounted on the adjustable mounting ring and is in a rotatable drive cooperation with the annular tooth ring through an output gear.

8. The water transportation pipe power generation device of claim 6, wherein a guide column is disposed at a position corresponding to each mounting plate at an inside of the adjustable mounting ring, and a slide hole in slide cooperation with the guide column is disposed at a corresponding position on the mounting plate; the mounting plate is limited and ensured its radial feed movement by the cooperation of the guide column and the slide hole.

9. The water transportation pipe power generation device of claim 1, wherein a flow guide disk structure is disposed at an inlet end of the rotor housing to uniformly direct the water flow to the position of the rotor blades on the inner sidewall of the rotor housing; the flow guide disk structure comprises a conical flow guide head and water split blades uniformly distributed on an outer edge of the flow guide head; a pointed end of the flow guide head faces toward the incoming water.

10. The water transportation pipe power generation device of claim 9, wherein an axially-extending extension part is disposed at both sides of the power generator housing respectively; an end head of the extension parts is provided with a pipe mouth docking structure to fixedly dock with the upstream and downstream pipes.

11. The water transportation pipe power generation device of claim 9, wherein the rotor blades are connected to the rotor housing in an angle-adjustable manner by connection shafts; an angle control mechanism is connected at a base of each connection shaft to change an angle of the rotor blades based on the water flow circumstances.

12. The water transportation pipe power generation device of claim 11, wherein the power generator housing is provided with an electric control box in which respective connectors of the plurality of fixed coil windings and the adjustable coil winding are integrated; the electric control box is further provided with a motor controller connected, in a controlled manner, with the radial adjustment motor, the axial feed motor and the angle control mechanism.

13. The water transportation pipe power generation device of claim 7, wherein a water pressure sensor is disposed in the rotor housing and a primary control module is disposed in the electric control box; the water pressure sensor and the motor controller are both connected to the primary control module in a controlled manner, and the rotor housing is further connected with a rotation speed sensor in a sensing manner, and the rotation speed sensor is connected with the primary control module.

\* \* \* \* \*